(12) United States Patent
Nam (10) Patent No.: US 9,821,638 B2
(45) Date of Patent: Nov. 21, 2017

(54) MOUNTING STRUCTURE OF EXTERIOR BELT

(71) Applicant: Hyundai Motor Company, Seoul (KR)

(72) Inventor: Yong-Hyun Nam, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 17 days.

(21) Appl. No.: 15/077,499

(22) Filed: Mar. 22, 2016

(65) Prior Publication Data

US 2017/0197499 A1 Jul. 13, 2017

(30) Foreign Application Priority Data

Jan. 12, 2016 (KR) .................. 10-2016-0003467

(51) Int. Cl.
| | |
|---|---|
| *B60R 13/02* | (2006.01) |
| *B60R 13/06* | (2006.01) |
| *B60J 5/04* | (2006.01) |
| *F16B 5/12* | (2006.01) |
| *B60J 10/36* | (2016.01) |

(52) U.S. Cl.
CPC ............ *B60J 5/0411* (2013.01); *B60J 10/36* (2016.02); *B60R 13/06* (2013.01); *F16B 5/126* (2013.01)

(58) Field of Classification Search
CPC .......... F16B 5/126; B60J 5/0411; B60J 10/30; B60J 10/36; Y10T 24/30; Y10T 24/309; Y10T 24/303; Y10T 24/45105; B60R 13/06
USPC ............................................. 296/1.08, 146.7
See application file for complete search history.

(56) References Cited

U.S. PATENT DOCUMENTS

| | | | | |
|---|---|---|---|---|
| 3,122,804 | A | * | 3/1964 | Stawinski ............... F16B 5/128 24/297 |
| 4,821,381 | A | | 4/1989 | Kaneko et al. |
| 5,639,522 | A | * | 6/1997 | Maki ...................... B60R 13/04 156/211 |
| 7,165,371 | B2 | * | 1/2007 | Yoyasu ................... B60R 13/04 24/292 |
| 7,257,867 | B2 | * | 8/2007 | Mizukoshi .............. B60R 13/08 24/297 |
| 8,322,110 | B2 | * | 12/2012 | Chou ...................... B60R 13/04 24/289 |

(Continued)

FOREIGN PATENT DOCUMENTS

| | | | |
|---|---|---|---|
| JP | 2004-176897 | * | 6/2004 |
| JP | 2007-009983 A | | 1/2007 |

(Continued)

*Primary Examiner* — Robert Canfield
(74) *Attorney, Agent, or Firm* — Mintz Levin Cohn Ferris Glovsky and Popeo, P.C.; Peter F. Corless (57) ABSTRACT

A mounting structure of an exterior belt is provided. The structure includes a frame and an end piece, and a door is coupled with an outer panel having a mounting aperture formed exterior an inner panel. Additionally, a first clip is formed at the end piece, and has a protrusion and a first slit formed at a front of the protrusion. A second clip is slidably coupled to the first clip and has a protruding portion. The second clip is inserted into the mounting aperture when the protruding portion is fitted into the first slit, and when one end thereof comes into contact with the inner panel when the protrusion is inserted into the mounting aperture, the other end thereof is moved backward toward the first clip, to restrict the first clip in the mounting aperture.

11 Claims, 5 Drawing Sheets

(56) References Cited

U.S. PATENT DOCUMENTS

| | | | |
|---|---|---|---|
| 2002/0021950 A1* | 2/2002 | Ichikawa | F16B 5/0642 |
| | | | 411/349 |
| 2007/0289770 A1* | 12/2007 | Koike | F16B 5/0621 |
| | | | 174/153 G |
| 2008/0073860 A1* | 3/2008 | Yamaguchi | B60R 13/04 |
| | | | 277/637 |
| 2010/0072735 A1* | 3/2010 | Kirchen | B60R 13/0206 |
| | | | 280/728.2 |
| 2012/0240363 A1* | 9/2012 | Lee | B60R 13/0206 |
| | | | 24/297 |
| 2012/0291240 A1* | 11/2012 | Suzuki | B60R 13/0206 |
| | | | 24/633 |
| 2014/0317889 A1* | 10/2014 | Hida | B60R 13/04 |
| | | | 24/293 |
| 2017/0129421 A1* | 5/2017 | Dickinson | B60R 13/0206 |

FOREIGN PATENT DOCUMENTS

| | | |
|---|---|---|
| JP | 4230388 B2 | 2/2009 |
| JP | 4597339 B2 | 12/2010 |
| JP | 2011-017350 A | 1/2011 |

\* cited by examiner

FORWARD DIRECTION ←→ BACKWARD DIRECTION

MOUNTING STRUCTURE OF EXTERIOR BELT

CROSS-REFERENCE TO RELATED APPLICATION

This application claims the priority benefit of Korean Patent Application No. 10-2016-0003467, filed on Jan. 12, 2016 in the Korean Intellectual Property Office, the disclosure of which is incorporated herein by reference.

BACKGROUND

Field of the Invention

The present invention relates to a structure for mounting an exterior belt to a vehicle door, and more particularly to a mounting structure of an exterior belt, which reduces production costs, prevents the formation of a gap, and prevents damage when an exterior belt is mounted or removed.

Description of the Related Art

Figure 1:
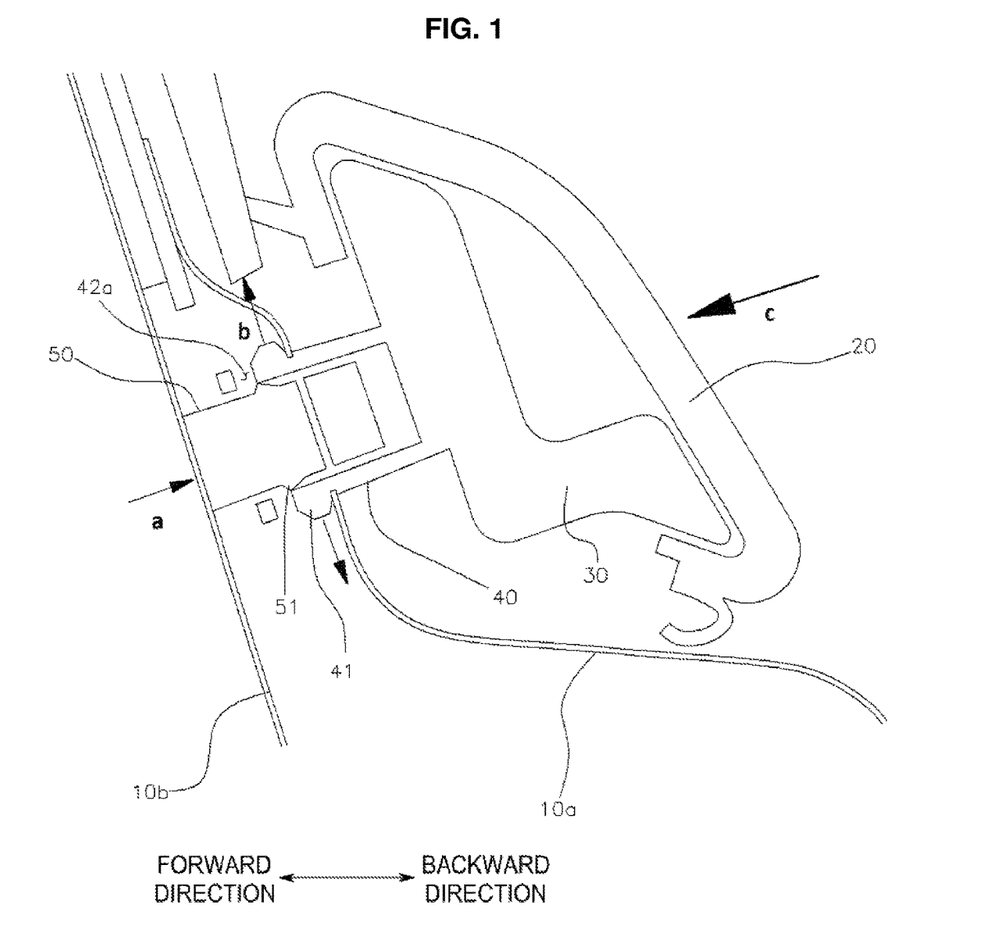
FIG. 1 is a view illustrating a conventional mounting structure in which a clip is formed in an end piece of an exterior belt and the end piece is coupled to an outer panel of a door according to the related art.
Figure 2:
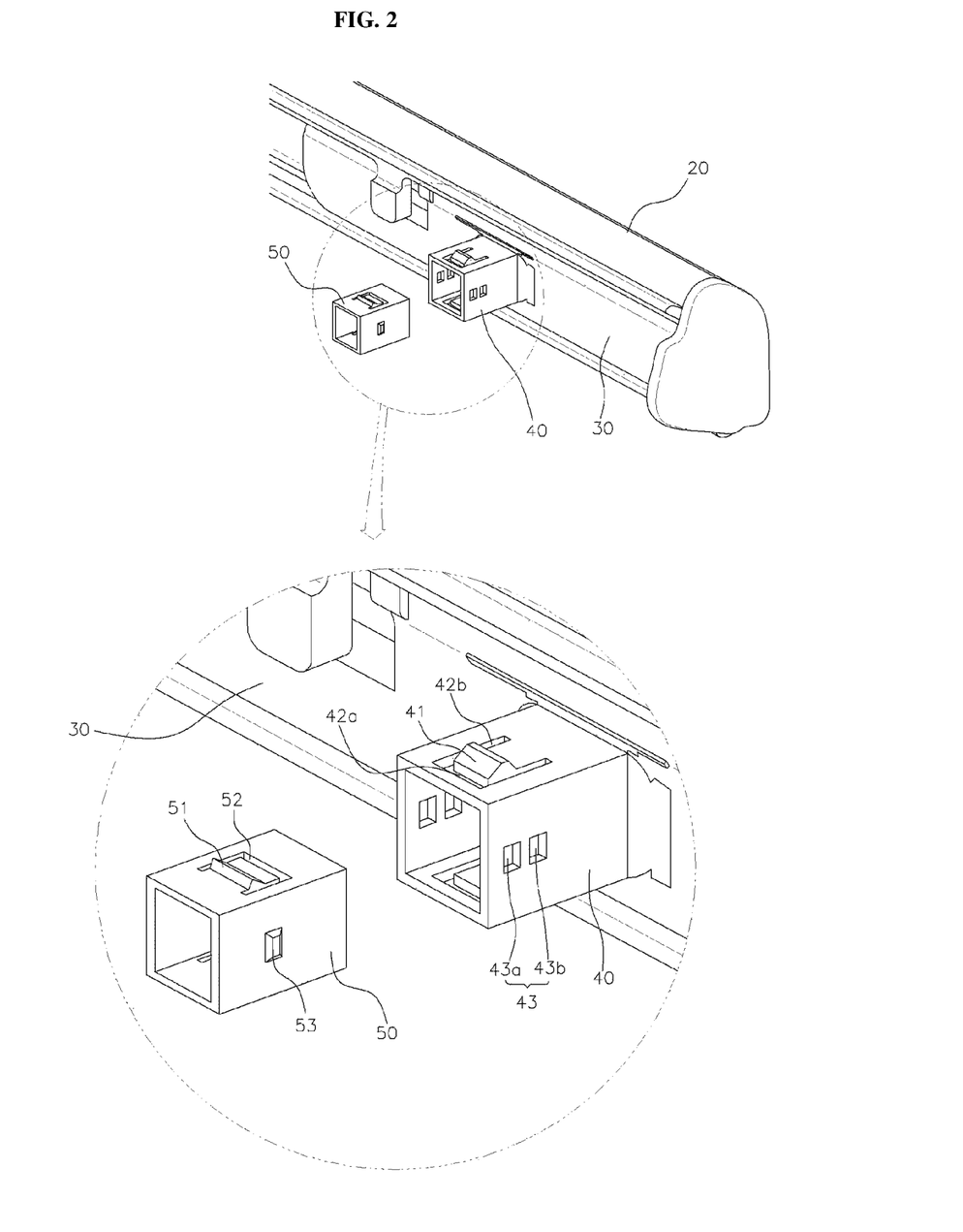
FIG. 2 is a view illustrating a state in which first and second clips are separated from each other according to an exemplary embodiment of the present invention.

As illustrated in FIG. 1 of the related art, an exterior belt is mounted to an outer panel 1a of a vehicle door 1 to be adjacent to a window glass which moves vertically within the vehicle door. The exterior belt improves a vehicle design, and is mounted together with or independently of a weather strip to prevent foreign substances and noise from being introduced into the gap between the window glass and the outer panel 1a.

The exterior belt includes a stainless steel frame 2 which is exposed to the exterior to improve the aesthetic appearance of the vehicle, and an end piece 3 which is coupled into the stainless steel frame 2 while being fixed to only the outer panel 1a or to both the outer panel 1a and an inner panel 1b. A variety of methods of coupling such an end piece 3 are known. Among these methods, a method of fastening an end piece using a screw and a method of fastening an end piece using an arrow-shaped clip 4 formed in the end piece are widely used.

The method of fastening the end piece using the screw is a method in which a screw bore is formed in the end piece and the screw is then fixed to the screw bore in the end piece which passes through inner and outer panels. This method has an advantage of preventing a gap from being formed between the end piece and the panels owing to the strong fastening force. However, the exterior belt may have a poor appearance due to the exposed screw, and it may take a substantial period of time to assemble the exterior belt.

As illustrated in FIG. 1, the method of fastening the end piece 3 using the arrow-shaped clip 4 formed in the end piece 3 is a method in which the clip 4 is formed integrally with the end piece 3, and is inserted into a mounting aperture formed in the outer panel 1a to fasten the end piece thereto. In other words, both ends (arrow-shaped portions) of the clip 4 are elastically deformed to contract when the clip is inserted into the mounting aperture when both ends of the clip are expanded, and both ends of the clip are elastically restored to an original state when the insertion of the clip 4 into the mounting aperture is completed, to fix the end piece to the outer panel. This method has advantages of achieving low cost and rapid assembly owing to the elimination of screws. However, a gap may be formed between the end piece and the panel in a vertical direction and/or a lateral direction due to the relatively weak fastening force (upon external impact etc.). Moreover, since the clip 4 may be damaged when the end piece is removed if necessary, costs for replacement thereof may be increased.

SUMMARY

Therefore, the present invention provides a mounting structure of an exterior belt, which may improve the external appearance of an exterior belt and reduce production costs. Additionally, the mounting structure may provide simplified assembly, prevent the formation of a gap, and prevent damage when the exterior belt is removed due to the omission of screws in the mounting structure.

In accordance with the present invention, the above and other objects may be accomplished by the provision of a mounting structure of an exterior belt including a stainless steel frame and an end piece coupled to each other while the end piece is fixed to an outer panel of a door in which the stainless steel frame is exposed to the exterior. The mounting structure may include the door coupled with the outer panel having a mounting aperture formed exterior an inner panel, a first clip formed at the end piece to be inserted into the mounting aperture, the first clip having a protrusion that extends from a surface thereof and a first slit formed at a front of the protrusion, and a second clip slidably coupled to the first clip and having a protruding portion that extends from a surface thereof, wherein the second clip may be inserted into the mounting aperture when the protruding portion is fitted into the first slit, and when one end (e.g., a first end) of the second clip comes into contact with the inner panel of the door when the protrusion is inserted into the mounting aperture, the other end (e.g., a second end) thereof may be moved backward toward an inside of the first clip, with the consequence that the protrusion increasingly protrudes by movement of the protruding portion to restrict the first clip in the mounting aperture.

The first clip may have a second slit additionally extending in forward and backward directions from the first slit to allow the protrusion to elastically deform when increasingly protruding. The protrusion may have an inclined surface formed at each of front and rear sides thereof, and the inclined surface formed at the rear side of the protrusion may have a greater angle of inclination than the inclined surface formed at the front side of the protrusion. Additionally, the protruding portion may have an inclined surface formed at each of front and rear sides thereof. The second clip may have a third slit that allows the protruding portion to more easily elastically deform when being fitted into the first slit. Each of the first and second clips may have a square pipe shape while having two lateral side surfaces between upper and lower surfaces thereof. The protrusion may be formed at each of the upper and lower surfaces of the first clip, and the protruding portion may be formed at each of the upper and lower surfaces of the second clip.

Further, a guide protrusion may be formed at one of an inner surface of the first clip and an outer surface of the second clip, and a guide aperture into which the guide protrusion is fitted may be formed at the other of the inner surface of the first clip and the outer surface of the second clip. The guide aperture may include a first guide aperture disposed to be proximate to an inside of the door (in the forward direction; see FIG. 5), and a second guide aperture disposed relatively outward (backward) than the first guide aperture. The guide protrusion may be fitted into the first guide aperture when the protruding portion is disposed at the first slit, and the guide protrusion may be fitted into the second guide aperture when the protruding portion moves to allow the protrusion to increasingly protrude. The protrusion may have a fixing groove formed at the rear side thereof to fit an edge portion of the mounting aperture into the fixing groove after the protrusion is inserted into the mounting aperture.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention will be described below in more detail with reference to the accompanying drawings. The present invention may, however, be embodied in different forms and should not be construed as limited to the embodiments set forth herein. Rather, these exemplary embodiments are provided so that this disclosure will be thorough and complete, and will fully convey the scope of the present invention to those skilled in the art. In certain exemplary embodiments, description irrelevant to the present invention may be omitted to avoid obscuring appreciation of the disclosure. Throughout the disclosure, like reference numerals refer to like parts throughout the various figures and embodiments of the present invention.

The terms and words used in the specification and claims should not be construed as having their ordinary or dictionary sense. On the basis of the principle that the inventor can define the appropriate concept of a term in order to describe his/her own invention in the best way, they should be construed as having meanings and concepts for complying with the technical idea of the present invention.

The present invention relates to a mounting structure of an exterior belt which may include a stainless steel frame 20 and an end piece 30 coupled to each other while the end piece 30 is fixed to an outer panel 10a (see FIG. 5) of a door to expose the stainless steel frame 20 to the exterior. Hereinafter, an exemplary embodiment of the present invention will be described in more detail with reference to the drawings.

Figure 5:
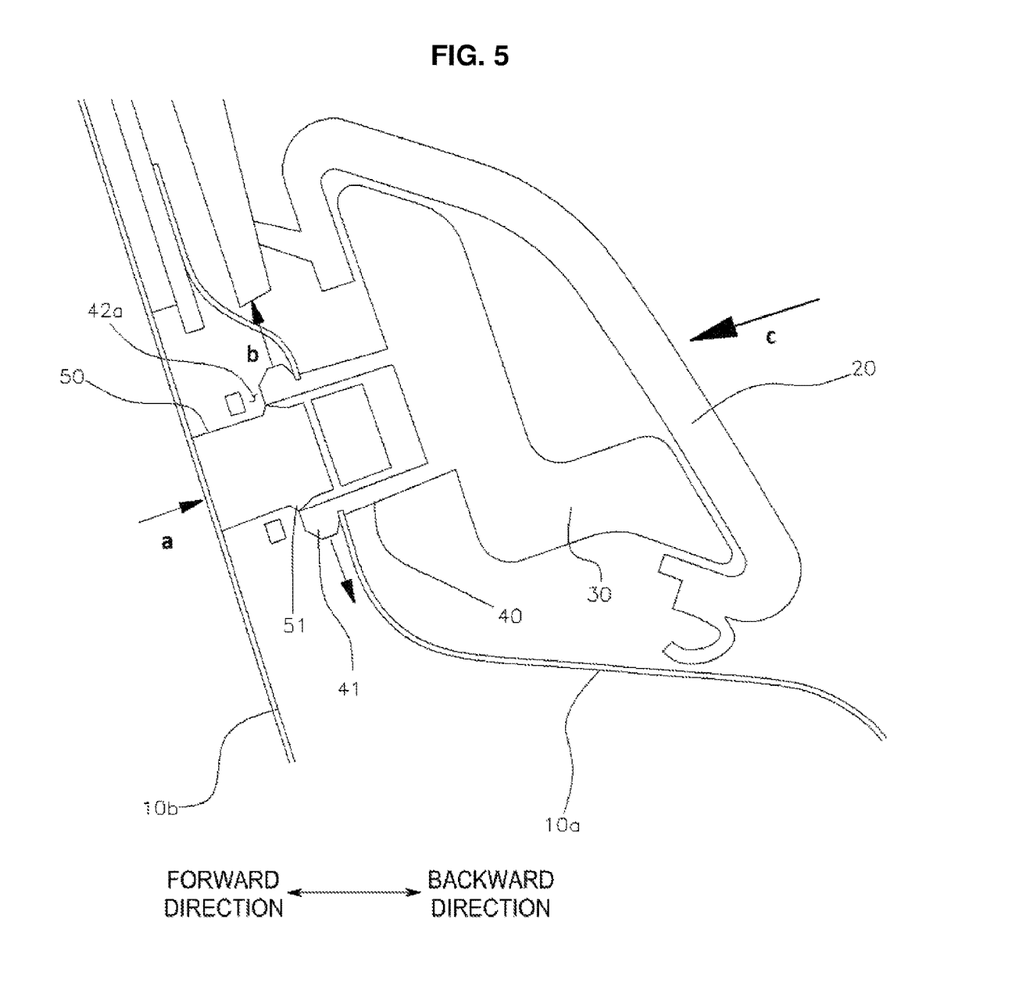
FIG. 5 is a view illustrating a state in which the first and second clips are inserted into a mounting aperture in the outer panel to be fastened thereto in the state of FIG. 4 according to an exemplary embodiment of the present invention.

Referring to the drawings, the door of the present invention may be coupled with the outer panel 10a, which has a mounting aperture formed extraneous to an inner panel 10b, while a space may be formed between the door and the outer panel (see FIG. 5). The exterior belt fixed to the mounting aperture has a structure in which the stainless steel frame 20 may be coupled to the end piece 30. The end piece 30 may be formed integrally with a first clip 40 (or the first clip 40 may be independently manufactured and coupled to the end piece 30), and the first clip 40 may be coupled with a second clip 50.

In the exemplary embodiment of the present invention, the first clip 40 may have a square pipe shape suitable for insertion into the mounting aperture (e.g., any shape that corresponds to the shape of the mounting aperture), and the second clip 50 may be a square pipe shape suitable to be fitted into the first clip 40 (e.g., any shape that corresponds to the first clip shape). The first clip 40 may include a protrusion 41 that extends from each of the upper and lower surfaces thereof, and a first slit 42a may be formed at the front of the protrusion 41 (e.g., in the direction in which the first clip is inserted into the mounting aperture as illustrated in FIG. 5). The second clip 50 may be slidably fitted into the first clip 40, and may include a protruding portion 51 that extends from each of the upper and lower surfaces thereof. The second clip 50 may be inserted into the mounting aperture together with the first clip 40 when the protruding portion 51 is fitted into the first slit 42a. The protruding portion 51 may be configured to press and elastically deform the protrusion 41 (in the direction in which the protrusion 41 increasingly protrudes).

In addition, the first clip 40 may include a second slit 42b additionally formed in the forward and backward directions from the first slit 42a to allow the protrusion 41 to more easily be elastically deformed in the direction in which it increasingly protrudes. The second clip 50 may include a third slit 52 (having a shape similar to the first and second slits) to allow the protruding portion 51 to be more easily elastically deformed when fitted into the first slit 42a.

The protrusion 41 may have an inclined surface formed at each of the front and rear portions or sections thereof. The inclined surface formed at the rear of the protrusion 41 may have a greater angle of inclination than the inclined surface formed at the front of the protrusion 41 thus allowing the first clip to be fastened using a smaller force when being inserted into the mounting aperture than when being removed therefrom. The protruding portion 51 may also have an inclined surface formed at each of the front and rear portions or sections thereof.

In addition, since each of the first and second clips 40 and 50 may have a square pipe shape or at least a similar shape, two lateral side surfaces are disposed between the upper and lower surfaces thereof. The first clip 40 may include two guide apertures 43 (43a and 43b) formed in each of both inner surfaces thereof, and the second clip 50 may include a guide protrusion 53 formed on each of both outer surfaces thereof to allow the guide protrusion 53 to be fitted into an associated one of the guide apertures 43.

Particularly, the guide apertures 43 may include a first guide aperture 43a disposed to be relatively close (e.g., proximate to) to the inside of the door (i.e. disposed relatively in the forward direction), and a second guide aperture 43b disposed relatively outward than the first guide aperture 43a (i.e. disposed relatively in the backward direction). In other words, the guide apertures may be formed adjacent to each other on a side surface of the first clip. One of the clips may be formed closer to the inside of the door than the other clip. Further, the guide protrusion 53 may be fitted into the first guide aperture 43a when the protruding portion 51 is disposed at the first slit 42a, and the guide protrusion 53 may be fitted into the second guide aperture 43b when the protruding portion 51 moves to allow the protrusion 41 to increasingly protrude. The protrusion 41 may include a fixing groove 44 formed at the rear thereof to fit the edge portion of the mounting aperture into the fixing groove 44 after the protrusion 41 is inserted into the mounting aperture (see FIG. 4).

Figure 3:
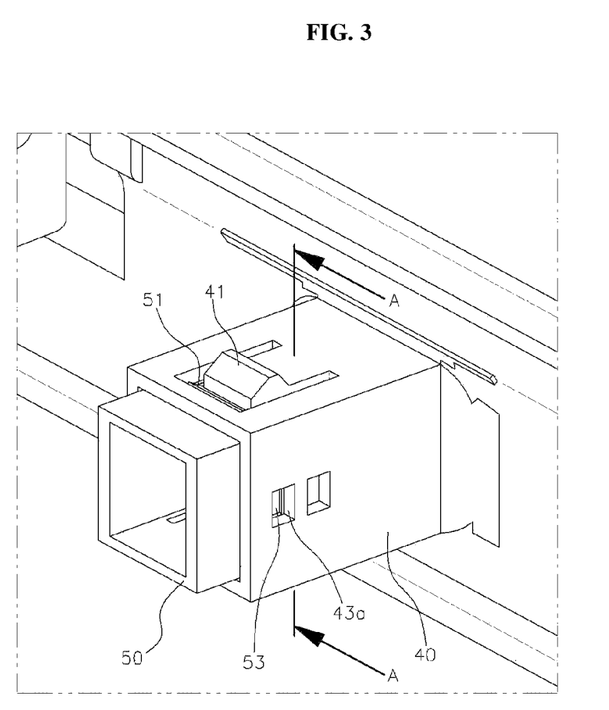
FIG. 3 is a view illustrating a state in which the second clip is coupled to the first clip in FIG. 2 according to an exemplary embodiment of the present invention.
Figure 4:
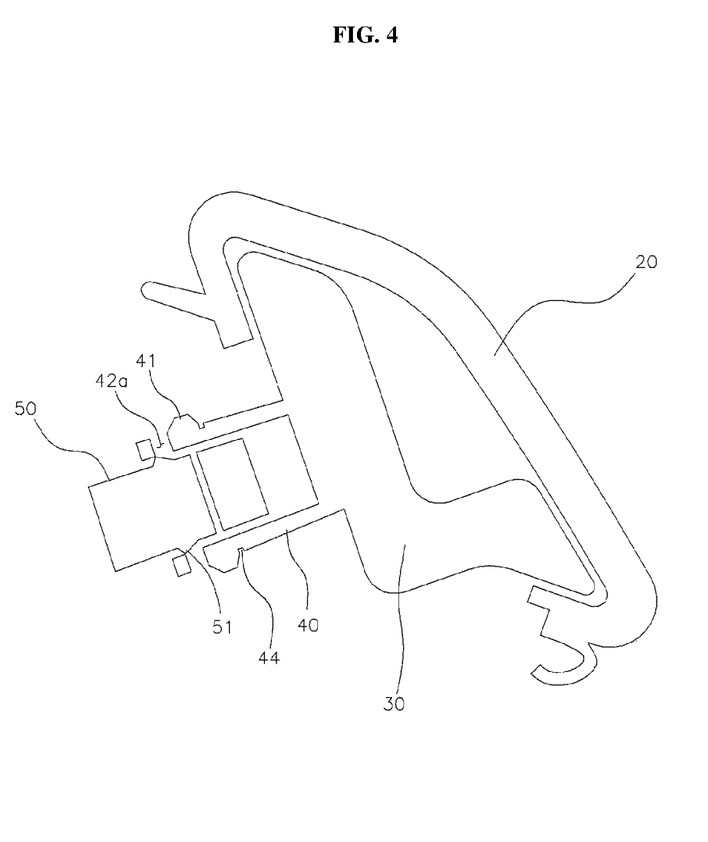
FIG. 4 is a cross-sectional view taken along line "A-A" of FIG. 3 according to an exemplary embodiment of the present invention.

In the exemplary embodiment of the present invention having the above configuration, as illustrated in FIGS. 3 and 4, the second clip 50 may be inserted into the mounting aperture in the outer panel 10a when the protruding portion 51 of the second clip 50 is fitted into the first slit 42a of the first clip 40. When the front tip (e.g., portion, segment, section, etc.) of the second clip 50 comes into contact with the inner panel 10b when the protrusion 41 is inserted into the mounting aperture, as illustrated in FIG. 5, a force is applied to the second clip in direction "a" by the reaction to a force in direction "c", occurring when the exterior belt is assembled, thereby moving the second clip 50 to the inside of the first clip 40 in the backward direction. In particular, the guide protrusion 53 may be separated from the first guide aperture 43a, and simultaneously, the protruding portion 51 may be configured to press (e.g., exert pressure against) the protrusion 41 to cause the protrusion 41 to increasingly extend in direction "b" and be elastically deformed.

When the backward movement of the second clip 50 to a predetermined position is completed, the guide protrusion 53 may be fitted into the second guide aperture 43b to fix the position of the second clip 50, and the protrusion 41 may be fixed in the state in which it protrudes maximally. Consequently, the mounting of the exterior belt may be completed. In particular, since the edge portion of the mounting aperture may be fitted into the fixing groove 44 in the first clip, the first clip may be more securely fastened to the outer panel 10a.

Conversely, when the exterior belt needs to be removed, the protrusion 41 may be pressed in the direction opposite to direction "b" along the inclined surface of the protrusion 41 adjacent to the outer panel 10a by a force applied in the direction opposite to direction "c", and thus a force may also be applied to the inclined surface of the protruding portion 51. Thus, the protruding portion 51 may be configured to move to the first slit 42a while the second clip 50 is pushed in the direction opposite to direction "a", and the protrusion 41 may be elastically deformed in the direction in which it decreasingly protrudes to thereby be separated from the mounting aperture.

The mounting structure of the exterior belt according to the present invention may improve the external appearance of the exterior belt, reduce production costs, and prevent damage when the exterior belt is removed, unlike conventional mounting methods. In particular, since the reaction to a force for applying the stainless steel frame 20 to the outer panel 10a acts to increase the fastening force of the exterior belt, it may be possible to prevent a gap from being formed between the exterior belt and the outer panel and to suppress movement therebetween owing to the strong fastening force.

In addition, each of the protrusion 41 and the protruding portion 51 may have an inclined surface, and the second and third slits 42b and 52 may be additionally formed, to more easily elastically deform the protrusion 41 and the protruding portion 51. The first and second clips 40 and 50 may include the guide aperture 43 and the guide protrusion 53, respectively, and therefore, the temporarily fastened and fixed state of the second clip 50 may be maintained. The first clip 40 may be more securely fixed to the outer panel 10a by the additional fixing groove 44 formed in the first clip 40.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mounting structure of an exterior belt, comprising:
    a frame and an end piece coupled to each other while the end piece is fixed to an outer panel of a door to expose the frame to an exterior, wherein the door coupled with the outer panel includes a mounting aperture formed exterior an inner panel;
    a first clip formed at the end piece to be inserted into the mounting aperture, the first clip having a protrusion that extends from a surface thereof and a first slit formed at a front of the protrusion; and
    a second clip slidably coupled to the first clip and having a protruding portion that extends from a surface thereof,
    wherein the second clip is inserted into the mounting aperture when the protruding portion is fitted into the first slit, and when a first end of the second clip comes into contact with the inner panel of the door when the protrusion is inserted into the mounting aperture, a second end thereof is moved backward toward an inside of the first clip, and the protrusion increasingly protrudes by movement of the protruding portion to restrict the first clip in the mounting aperture.

2. The mounting structure according to claim 1, wherein the first clip includes a second slit additionally extending in forward and backward directions from the first slit to cause the protrusion to be elastically deformed when increasingly protruding.

3. The mounting structure according to claim 1, wherein the protrusion has an inclined surface formed at each of front and rear sides thereof.

4. The mounting structure according to claim 1, wherein the protruding portion has an inclined surface formed at each of front and rear sides thereof.

5. The mounting structure according to claim 1, wherein the second clip includes a third slit to cause the protruding portion to be elastically deformed when being fitted into the first slit.

6. The mounting structure according to claim 1, wherein each of the first and second clips has a square pipe shape while including two lateral side surfaces between upper and lower surfaces thereof.

7. The mounting structure according to claim 6, wherein the protrusion is formed at each of the upper and lower surfaces of the first clip, and the protruding portion is formed at each of the upper and lower surfaces of the second clip.

8. The mounting structure according to claim 7, further comprising:

a guide protrusion formed at one of an inner surface of the first clip and an outer surface of the second clip; and a guide aperture into which the guide protrusion is fitted is formed at the other of the inner surface of the first clip and the outer surface of the second clip.

9. The mounting structure according to claim 8, wherein the guide aperture includes a first guide aperture disposed adjacent to a second guide aperture.

10. The mounting structure according to claim 9, wherein the guide protrusion is fitted into the first guide aperture when the protruding portion is disposed at the first slit, and the guide protrusion is fitted into the second guide aperture when the protruding portion moves to allow the protrusion to increasingly protrude.

11. The mounting structure according to claim 6, wherein the protrusion includes a fixing groove formed at the rear side thereof to fit an edge portion of the mounting aperture into the fixing groove after the protrusion is inserted into the mounting aperture.

* * * * *